US008511540B2

(12) United States Patent
Anguiano (10) Patent No.: US 8,511,540 B2
(45) Date of Patent: Aug. 20, 2013

(54) MATRIX CODE FOR USE IN VERIFICATION OF DATA CARD SWAP

(75) Inventor: Jason Anguiano, Castle Rock, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 363 days.

(21) Appl. No.: 13/031,115

(22) Filed: Feb. 18, 2011

(65) Prior Publication Data

US 2012/0215830 A1    Aug. 23, 2012

(51) Int. Cl.
*G06F 17/00*    (2006.01)
(52) U.S. Cl.
USPC ............................ 235/375; 235/380; 709/203
(58) Field of Classification Search
USPC ................... 235/375, 380, 494; 709/203
See application file for complete search history.

(56) References Cited

U.S. PATENT DOCUMENTS

| | | |
|---|---|---|
| 4,809,325 A | 2/1989 | Hayashi et al. |
| 4,837,414 A | 6/1989 | Edamula |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,959,285 A | 9/1999 | Schuessler |
| 5,978,855 A | 11/1999 | Metz et al. |
| 6,006,990 A | 12/1999 | Ye et al. |
| 6,058,238 A | 5/2000 | Ng |
| 6,512,919 B2 | 1/2003 | Ogasawara |
| 6,556,273 B1 | 4/2003 | Wheeler et al. |
| 6,983,304 B2 | 1/2006 | Sato |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |

(Continued)

FOREIGN PATENT DOCUMENTS

| | | |
|---|---|---|
| CN | 1571503 A | 1/2005 |
| CN | 101 227 581 A | 7/2008 |

(Continued)

OTHER PUBLICATIONS

International Search Report and Written Opinion of PCT/US11/59977 mailed on Mar. 19, 2012, 7 pages.

(Continued)

*Primary Examiner* — Allyson Trail
(74) *Attorney, Agent, or Firm* — Kilpatrick Townsend & Stockton LLP (57) ABSTRACT

A content receiver receives an update to a memory unit contained therein utilizing data stored in a data card inserted or incorporated into the content receiver. The content receiver dynamically generates a matrix code based on the updates received in the memory and on information uniquely identifying the content receiver. The matrix code is transmitted to a content display device for display, and a matrix code reader detects the displayed matrix code and transmits information contained within the matrix code to a content provider for updating a user's account associated with the updated content receiver. The content provider may transmit a message to the content receiver for display on the content display device indicating the update to the user's account. The content provider may transit a similar message to the matrix code reader.

20 Claims, 6 Drawing Sheets

(56) References Cited

U.S. PATENT DOCUMENTS

| | | |
|---|---|---|
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,386,339 B2 | 2/2013 | Minnick et al. |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Gerard Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0088213 A1 | 4/2009 | Rofougaran |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0039573 A1 | 2/2011 | Hardie |
| 2011/0065451 A1 | 3/2011 | Danado et al. |
| 2011/0107386 A1 | 5/2011 | De Los Reyes et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1* | 6/2012 | Gerhards et al. ............ 386/291 |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1* | 8/2012 | Minnick et al. ............ 235/375 |
| 2012/0206648 A1* | 8/2012 | Casagrande et al. ........ 348/462 |
| 2012/0217292 A1 | 8/2012 | Gratton et al. |

| | | | |
|---|---|---|---|
| 2012/0217293 | A1 | 8/2012 | Martch et al. |
| 2012/0218470 | A1 | 8/2012 | Schaefer |
| 2012/0218471 | A1 | 8/2012 | Gratton |
| 2012/0222055 | A1 | 8/2012 | Schaefer et al. |
| 2012/0222071 | A1 | 8/2012 | Gaede et al. |
| 2012/0222081 | A1 | 8/2012 | Schaefer et al. |
| 2013/0068838 | A1* | 3/2013 | Gomez et al. ............... 235/380 |

FOREIGN PATENT DOCUMENTS

| | | |
|---|---|---|
| DE | 10 2007 038 810 A1 | 2/2009 |
| EP | 1 021 035 A | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2010/149161 A1 | 12/2010 |
| WO | 2011/009055 A2 | 1/2011 |

OTHER PUBLICATIONS

International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.

U.S. Appl. No. 12/986,721, filed Jan. 7, 2011, Office Action mailed Mar. 16, 2012, 6 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org.%2Fie..., Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.

U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 13/037,312, filed Feb. 28, 2011, Office Action mailed Aug. 15, 2012, 9 pages.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.

* cited by examiner

MATRIX CODE FOR USE IN VERIFICATION OF DATA CARD SWAP

FIELD OF THE INVENTION

This disclosure relates generally to confirming updates of content receivers, and more specifically to confirming data stored in a data card paired with a content receiver has been used to update the content receiver utilizing matrix codes dynamically generated by the content receiver.

SUMMARY

The present disclosure discloses systems and methods for confirming a content receiver has been updated utilizing matrix codes, such as (but not limited to) QR codes. An electronic device such as a content receiver receives an update at the content receiver using a source of data and dynamically generates a matrix code that includes information identifying the source of data that was used to update the content receiver as well as identification data unique to the content receiver. The source of the data used in the update may be a data card having data stored therein that is inserted into or incorporated with the content receiver. The content receiver transmits the matrix code to a content display device, and the display device displays the matrix code on a display. The matrix code is decodable by a matrix code reader, which detects the matrix code on the display and transmits the decoded information contained within the matrix code to initiate an update to a user account associated with the identification data unique to the content receiver. The update includes information identifying the source of data for the update to the content receiver. This update may be at a database supported by the content provider or an affiliate thereof that receives the information within the matrix code and uses the information to update user account information. The update to the user account, for example, allows the content provider to transmit content to the updated content receiver in a manner consistent with the update.

In some implementations, a system for confirming a content receiver has received an update utilizing matrix codes includes a content receiver and a content provider remotely located from the content receiver.

The content receiver includes a processing unit that dynamically generates a matrix code. The information contained within the matrix code includes information identifying a source of data for the update to the content receiver and identification data unique to the content receiver. The content receiver also includes a communications unit that transmits the matrix code to a content display device. The matrix code is decodable by a matrix code reader that optically captures an image of the matrix code displayed on the display unit to initiate an update to a user account at the content provider, said user account associated with the identification data unique to the content receiver and updated with information identifying the source of data for the update to the content receiver.

In certain implementations, a message is delivered to the content receiver that the update at the content provider was successful. In additional or alternative implementations, the content provider delivers a message to the matrix code reader indicating the update to the content provider memory unit. The content receiver may also generate a message for display on the content display device indicating the memory unit residing in the content receiver was updated. In addition or alternatively, the content provider may generate and transmit to the content receiver a message for display on the content display device indicating the memory unit residing in the content receiver was updated.

In other implementations, a system for confirming a content receiver has received an update utilizing matrix codes includes a matrix code reader. The matrix code reader uses an optical input unit to optically detect a matrix code displayed on a display unit. A processing unit decodes the detected matrix code. Information contained within the matrix code comprises information identifying a source of data for an update to a content receiver and identification data unique to the content receiver. A communications unit transmits information in the decoded matrix code to a content provider, and the transmitted information initiates an update to a user account at the content provider. The account is associated with the identification data unique to the content receiver and updated with information identifying the source of data for the update to the content receiver.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Content receivers, including set top boxes, digital video recorders, television receivers such as satellite receivers and cable receivers, generally receive content from a content provider, including satellite programming companies, cable programming companies, and Internet service providers, and the like, for transmission of the content to content display devices, including televisions, and speakers, and so on. The content receivers are generally issued to users, including subscribers or paying customers, by the content provider. For example, the content provider may assign the content receiver to the user, and the user may view content on their content display device via the communicatively coupled content receiver. The content receiver may receive transmitted data from the content provider at the user's location for several years without the need for servicing or replacing the content receiver. Thus, the content receivers may reside at the user's location for an extended period of time.

Periodically, security access codes, encryption codes, the internal memory associated with the data storage units residing in the content receivers and the like require updating. The content provider may, for example, require updating of the security or encryption technology associated with the data storage units to ensure the content receiver is not being accessed without authorization from the content provider. Software applications or software updates may also be uploaded into the data storage units of the content receivers. These updates may be provided in the form of data stored in physical data cards provided to users. The data cards may include memory and processor components, and the data cards may be: security cards; encryption cards; smart cards; integrated circuit cards; memory cards; microprocessor cards; bar code cards; and conditional access modules with memory components. The users insert or incorporate the data cards into their respectively assigned content receivers, and the data stored in the data cards is uploaded into and/or accessed by the data storage units residing in the content receivers, thereby updating the content receiver. Typically, the data card will remain in the content receiver, thereby allowing the data storage unit in the content receiver and the data card to interact during operation of the content receiver. Thus, the data in data card may be accessed instead of being uploaded into the content receiver.

Moreover, once the data storage units in content receivers or, in some implementations, the security access codes in the security access units of the content receivers, are updated, the content providers or affiliates thereof may require notification of the updates to the content receivers so that the content provider provides and the content receivers receive content in a manner consistent with the updates. Otherwise, the content receivers may be considered inactive by the content provider, and the content provider may cancel transmission services to the content receivers, thus rendering the content receivers inoperable or inactive.

Often, users are required to follow instructions sent by the content provider or an affiliate thereof via postal mail instructing the users to notify the content provider of the update to the respective content receivers. Among other possible issues, these instructions may be confusing to the users, the users may delay in contacting the content provider after the update, or the instructions may be lost. Even where users are able to follow the instructions and the content provider is contacted to report the updates, the users may have difficulty in providing the customer service representatives or an interactive voice response system with information about their respective user account, such as a user account number, a content receiver unique identifier (e.g., number code, alpha code, or alpha-numeric code, physical address and/or network address associated with the content receiver), and about the data card or its unique identifier that was used to update the content receiver. In situations where the user fails to notify the content provider or does not adequately communicate the required information to the content provider, the content receiver may be inactivated, thereby delaying providing content to the user even where the user did not intend to have the service to their content receiver deactivated.

In some situations, the content provider may make assumptions that the user successfully uploaded or accessed the data from the data card into the content receiver, and after a period of time after sending the data card to the user, may commence the transmission of content to the receiver based on the update. If the user failed to update the content receiver with the data from the data card, the content receiver may not deliver/transmit content to the content display device correctly due to a security access error or the content display device may be sent an error code from the content receiver. This may also delay providing content to the user due to the user not understanding their content receiver required updating within a certain period of time.

The present disclosure discloses systems and methods for notifying a content provider that a content receiver has been updated in an efficient manner by utilizing a matrix code dynamically generated using the content receiver. Upon receiving a data update, for example from data stored on a data card, the content receiver may dynamically generate a matrix code containing information identifying the source of the update (e.g., a unique identifier associated with the data card) and uniquely identifying the content receiver. The user captures the matrix code using a matrix code reader so that data from the matrix code can be transmitted to the content provider for updating the user's account. The present disclosure also discloses systems and methods for providing a user with confirmation from the content provider that the user's account and/or content receiver has been updated based on the receipt of data from the matrix code by the content provider.

Figure 1:
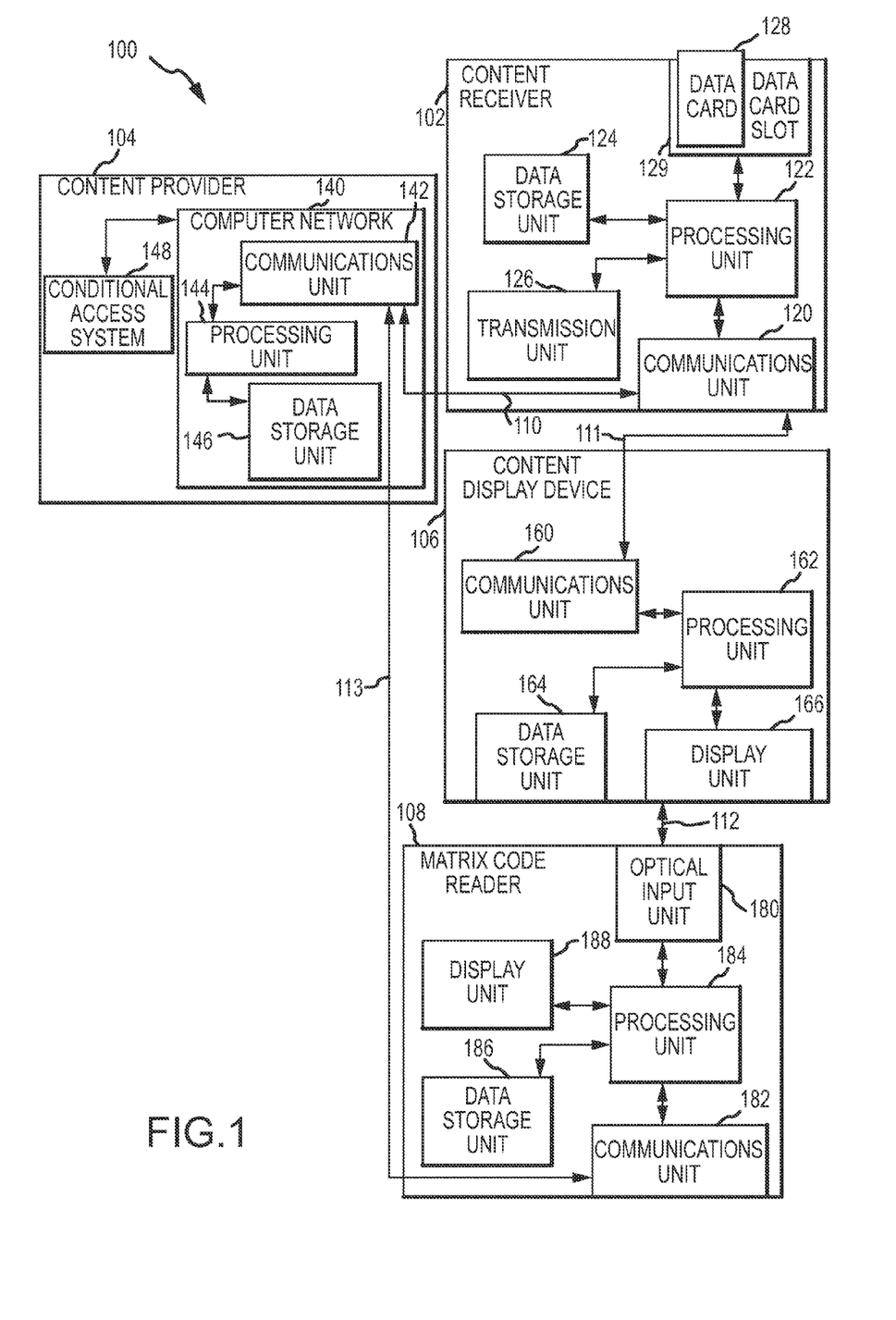
FIG. 1 is a block diagram illustrating a system for confirming a content receiver has been updated utilizing matrix codes.

FIG. 1 is a block diagram illustrating a system 100 for providing notification to a content provider or an affiliate thereof of an update to a content receiver using dynamically generated matrix codes, and in some instances, to a user that the user's content receiver and/or user account has been updated. The system 100 includes a content receiver 102 (such as a set top box) for receiving and transmitting content (such as television programming), a content provider 104 for transmitting the content (such as a satellite or cable programming service provider), a content display device 106 for receiving and displaying the content (such as a television), and a matrix code reader 108 for capturing and transmitting data (such as a device capable of detecting and decoding a matrix code such as a camera phone or mobile computing device with Internet connection capabilities).

The content receiver 102 is a device for receiving content from the content provider 104 and for transmitting the content to the content display device 106. The content receiver 102 is, for example, a set top box, a television receiver, a digital video recorder, a computing device, a gaming device, or a television, which is located at a user's location (such as a user's residence or business). The content receiver 102 is operable to receive content from the content provider 104 by way of a transmission link 110, which provides content in the form of data that is received by the communications unit 120 of the content receiver 102. The received content is provided to the processing unit 122 for executing instructions stored in the data storage unit 124 (such as non-transitory storage media, which may take the form of, but is not limited to, a magnetic storage medium; optical storage medium; magneto-optical storage medium; read only memory; random access memory; erasable programmable memory; flash memory; and so on) for decrypting and providing content to the content display device 106 via the transmission unit 126. The processing unit 122 also executes instructions stored in data storage unit 124 for dynamically generating matrix codes (such as QR codes). The content receiver includes a data card 128 and a data card slot 129, for receiving the data card 128. The data card 128 provides the data storage unit 124 with codes and/or instructions executable by the processing unit 122 for decrypting data received from the content provider and for confirming that content is securely provided to and transmitted by the content receiver.

The content provider 104 is generally remotely located from the content receiver 102. The content provider 104 is, for example, a satellite programming company, a cable company, an Internet service provider, e.g., an online video service or Internet video provider, and the like, that uses a computer network 140 to deliver content to the content receiver 102. The network 140 includes a communications unit 142 and a processing unit 144 for executing instructions stored in the data storage unit 146 (such as non-transitory storage media, which may take the form of, but is not limited to, a magnetic storage medium; optical storage medium; magneto-optical storage medium; read only memory; random access memory; erasable programmable memory; flash memory; and so on). The content provider 104 receives, manages and stores content, which is transmitted by the communications unit 142 to the communications unit 120 of the content receiver 102 via the transmission link 110. The content provider 104 provides content primarily to customers, and thus the content provider 104 also manages customer accounts and provides content to the users having the associated customer accounts. Customer's access to transmissions are generally managed by a conditional access system (CAS) 148 that is a component of or is communicatively coupled to the computer network 140. The CAS 148 generally controls content to which the user (e.g., subscriber) has access by locking and unlocking content delivered to the content receiver 102 and/or the user's account, tracks content receivers 102, data cards 128, and the like, and associates unique identification data associated with each of the content receivers 102 and the data cards 128 with the user's account, which may additionally include the user's personal information such as the user's name, physical address of their assigned content receiver 102, network address of the user's assigned content receiver 102, matrix code reader 108 network address and phone number, and billing information. This allows the content provider to manage the content transmitted to the user's content receiver 102 based on the information stored in the user's account. The CAS 148 in connection with the network 140 may be accessed by the matrix code reader 108 via a website or e-mail address supported by the network 140. The CAS 148 is periodically updated with user account information by the matrix code reader 108 sending updates to the network 140 via the website or e-mail address. In some implementations, the processing unit 144 and the data storage unit 146 stores and manages data related to the user's account. In this implementation, the CAS 148 and the communications unit 142 within the network 140 are communicatively coupled to update the user account data within the network 140 as well as the data stored in the CAS 148 related to the user's associated content receiver 102 and data card 128. As described further below, the matrix code reader 108 may provide updated data reflective of user account information, including content receiver and data card information provided in the form of a matrix code that the matrix code reader 108 detects and decodes the information contained therein.

The content display device 106 is generally arranged proximate to and is communicatively coupled to the content receiver 102 and displays content from the content receiver 102. While content display device 106 and the content receiver 102 are depicted as separate components in FIG. 1, it will be appreciated that the content receiver 102 may be incorporated with the content display device 106. The content display device 106 is, for example, a television, a computer screen, a video screen, or any other display device for displaying content or images capable of being visually perceptible by a user, and as explained further below, images capable of being captured by a device such as a matrix code reader 108. The content display device 106 includes a communications unit 160, which receives content from the communications unit 120 of the content receiver 102 by way of the transmission link 111. The content display device 106 also includes a processing unit 162 for executing instructions stored in a data storage unit 164 (such as non-transitory storage media, which may take the form of, but is not limited to, a magnetic storage medium; optical storage medium; magneto-optical storage medium; read only memory; random access memory; erasable programmable memory; flash memory; and so on). In addition, the content display device 106 includes a display unit 166 for displaying the content received from the content receiver 102.

The matrix code reader 108 is generally provided in an area proximate the content display device 106 and is communicatively coupled to the content display device 106 by way of the transmission link 112. The matrix code reader 108 is also communicatively coupled to the content provider 104 by way of the transmission link 113. The matrix code reader 108 is, for example, a reader device, such as a mobile phone or a mobile computing device with camera or video capture capabilities and network, Internet, and/or intranet connection capabilities. The matrix code reader 108 includes an optical input unit 180 for capturing matrix code images, a communications unit 182 for sending and receiving information, a processing unit 184 for executing instructions stored in a data storage unit 186 (such as non-transitory storage media, which may take the form of, but is not limited to, a magnetic storage medium; optical storage medium; magneto-optical storage medium; read only memory; random access memory; erasable programmable memory; flash memory; and so on), and a display unit 188 for displaying or presenting information stored within the data storage unit 186 such as images captured by the optical input unit 180 as well as information generated by the processing unit 184. The optical input unit 180 is configured to capture the matrix code displayed on the display unit 166 of the display device 106 via transmission link 112. The matrix code reader 108 includes instructions stored in the data storage unit 186 for detecting and decoding matrix codes, which are executed by the processing unit 184 to cause the optical input unit 180 to capture the matrix code. Upon capturing the matrix code, the processing unit 184 decodes the captured matrix code. The matrix code reader 108 transmits the decoded data via the communications unit 182 to the communications unit 142 of the content provider 104 by way of the transmission link 113. For example, using the decoded data from the matrix code, the processing unit 184 executes instructions for connecting the communications unit 182 to a URL associated with the communications unit 142 of the content provider 104 and for delivering data to the communications unit 142 including information identifying a source of the update to the content receiver 102 (e.g., the identification code of the data card 128) and uniquely identifying the content receiver 102. The data is used to update the CAS 148 at the content provider 104. The matrix code reader 108 may automatically transmit the data from the matrix code to the content provider 104, or the user operating the matrix code reader 108 may be prompted to connect to the Internet and/or send the data to the content provider 104.

The matrix code is dynamically generated by the processing unit 122 of the content receiver 102. The data storage unit 124 of the content receiver 102 contains matrix code generation instructions that are executed by the processing unit 122. The data embedded within the matrix code may contain information including unique identifiers assigned to or associated with a content receiver 102 dynamically generating the matrix code (e.g., a physical address, network address, unique identifier, and/or user account number for content receiver 102), unique identifiers assigned to the data card 128 used in connection with updating the content receiver 102, the website, e-mail address or other information related to communicating with the content provider 104, whether the content receiver 102 update was successful or unsuccessful, internal check information related to the operational status of the content receiver 102 such as its expected remaining lifespan, and the date and time of update. The matrix code delivered by the content receiver 102 to the content display device 106 may be perceptible to the user on the display unit 166, but is at least configured to be recognized by the optical input unit 180 of the matrix code reader 108 and to be decoded by the processing unit 184 of the matrix code reader 108.

Figure 2:
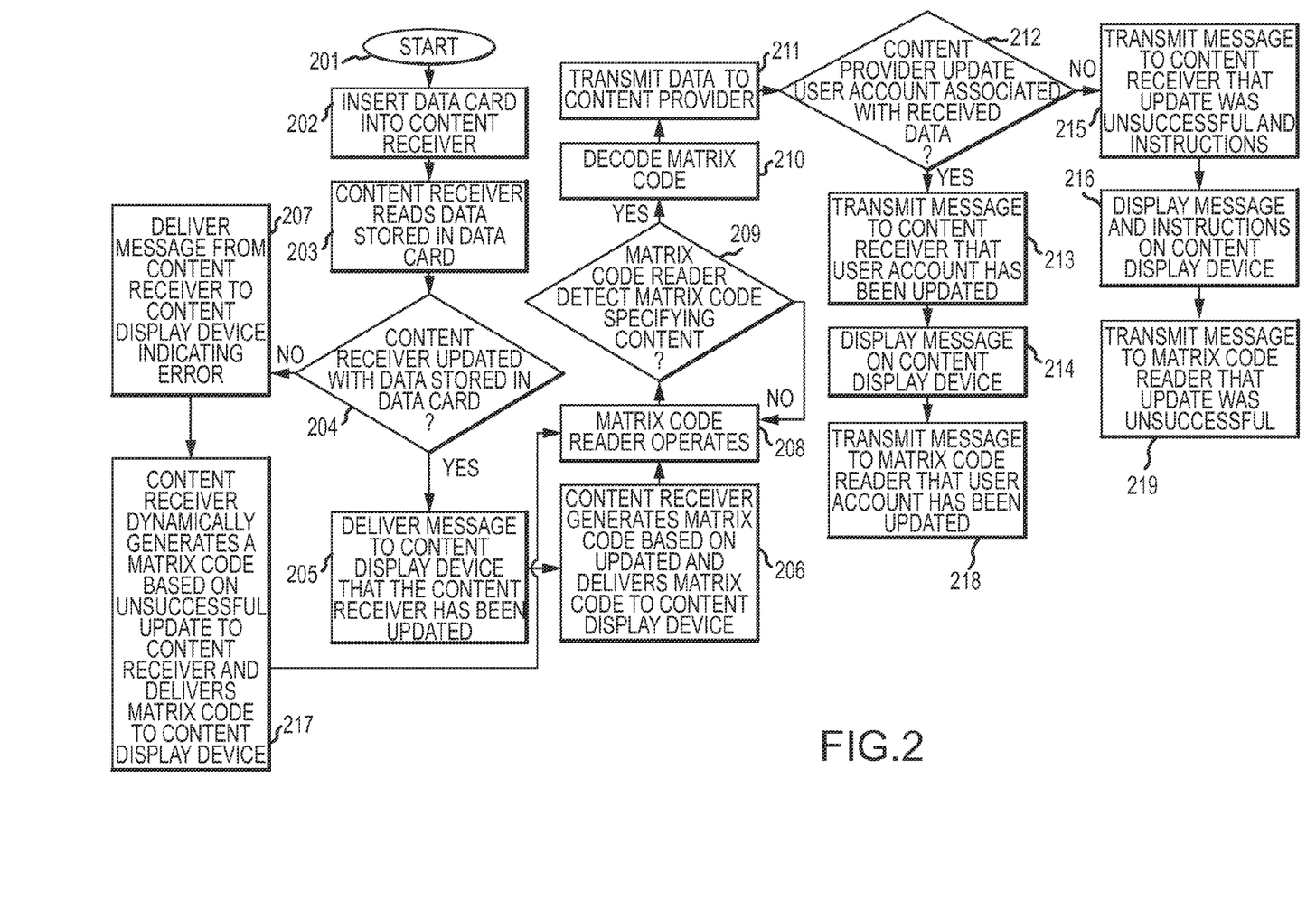
FIG. 2 is a flow chart illustrating a method for confirming a content receiver has been updated utilizing matrix codes. This method may be performed by the system of FIG. 1.

FIG. 2 illustrates a method 200 for providing notification to a content provider of an update to a content receiver using dynamically generated matrix codes. The method 200 may be performed by the system 100 of FIG. 1. The flow begins at block 201 and proceeds to block 202 where a data card 128 with update data stored therein is inserted into a content receiver 102. The flow then proceeds to block 203 where the processing unit 122 of the content receiver 102 reads data stored in the data card 128. The content receiver 102 performs a check of the data within the data card 128 at block 204 and determines whether or not the update data will be used to update the content receiver 102. If so, the flow optionally proceeds to block 205, where a message is delivered by the content receiver 102 to the content display device 106 indicating to the user that the content receiver has been updated. If the update data is incorporated into the content receiver 102 and the update is successful, the flow proceeds to block 206 where the content receiver 102 dynamically generates a matrix code (such as a QR code) that includes information specific to the update to the content receiver 102 (e.g., the identifier for the data card 128) and to the unique identification of the content receiver 102, and delivers the matrix code to the content display device 106. Otherwise, if the update is unsuccessful, the flow proceeds to block 207 where the content receiver 102 delivers a message to the content display device 106 that an error occurred, such as an error in reading the data stored in the data card 128, that the data card 128 is not correctly paired the content receiver 102, or that the data card 128 is not correctly inserted into the data card slot 129. In some instances, the message displayed may include troubleshooting instructions various reasons why the update may have been unsuccessful and on how to attempt to remedy the problem.

At block 208, the matrix code reader 108 operates to capture the matrix code displayed on the content display device 106. Proceeding to block 209, the matrix code reader 108 detects whether or not content is specified within the matrix code. If so, the flow proceeds to block 210 where the matrix code reader 108 decodes the matrix code. Otherwise, the flow returns to block 208 and attempts to capture the matrix code displayed.

At block 211, after the data from the matrix code is decoded, the matrix code reader 108 transmits the information specific to the update to the content provider 104. Proceeding to block 212, the content provider 104 determines whether the user's account associated with the update to the content receiver 102 will be updated. For example, the content provider may attempt to match the information received from the matrix code reader 108 with information stored in the CAS 148, and based on the outcome, the update is confirmed or rejected. If the user's account is updated, the flow proceeds to block 213 where the content provider 104 transmits a message to the content receiver 102 that the user's account associated with the content receiver 102 has been updated. The flow then proceeds to block 214 where the content receiver 102 delivers the message to the content display device 106, thus visually communicating to the user the user account update. In another example, the message transmitted and displayed may additionally or alternatively indicate the content receiver 102 has been updated. Where the user's account is not updated using the information received from the matrix code reader 108, the flow proceeds to block 215 where the content provider 104 transmits a message to the content receiver 102 that the update to the user's account was unsuccessful and instructions on how the user should proceed to update the user account. The flow then proceeds to block 216 where the content receiver 102 delivers the message and instructions to the content display device 106, thus communicating to the user the user's account was not updated and how to solve the problem. In another example, the message transmitted and displayed may additionally or alternatively indicate whether or not content receiver 102 was updated. For example, even where the user account is not updated at the content provider 104, there may be instances where the content receiver 102 is updated (correctly or incorrectly).

In some instances, and with reference to block 207, the flow may optionally proceed to block 217 where the content receiver 102 dynamically generates a matrix code (such as a QR code) that includes information specific to why the update to the content receiver 102 was unsuccessful as well as the unique identification of the content receiver 102. In this case, a message viewable by the user is displayed on the content display device 106 along with the matrix code, and the message may indicate the content provider 104 will provide instructions on troubleshooting upon the user utilizing the matrix code reader 108 and sending the data from the matrix code to the content provider 104. The flow would then continue to block 208 where the matrix code reader 108 operates to capture the matrix code displayed on the content display device 106, and the flow would continue through to block 212. Because the data transmitted to the content provider 104 indicates the update to the content receiver 102 was unsuccessful, the flow would proceed to block 215 where the content provider 104 transmits a message to the content receiver 102 that the update to the user's account was unsuccessful and instructions on how the user should proceed to update the user account, e.g., provide instructions to remedy the specific reason why the update to the content receiver 102 was unsuccessful, and the flow would then proceed to block 216 where the content receiver 102 delivers the message and troubleshooting instructions to the content display device 106.

In some instances, and with reference to block 214, upon the content receiver 102 delivering the message to the content display device 106 related to the successful update, the flow may optionally proceed to block 218 where a message is transmitted to the matrix code reader 108 that the user's account has been updated. Otherwise, and with reference to block 216 upon the content receiver 102 delivering the message and instructions to the content display device in relation to the unsuccessful update, the flow may optionally proceed to block 219 in which a message is transmitted to the matrix code reader 108 that the update was unsuccessful. In some implementations, the content provider may also transmit instructions on how the user should proceed to update the user account, as described above. The messages received by the matrix code reader 108 may be transmitted by the content provider 104, for example.

Figure 3A:
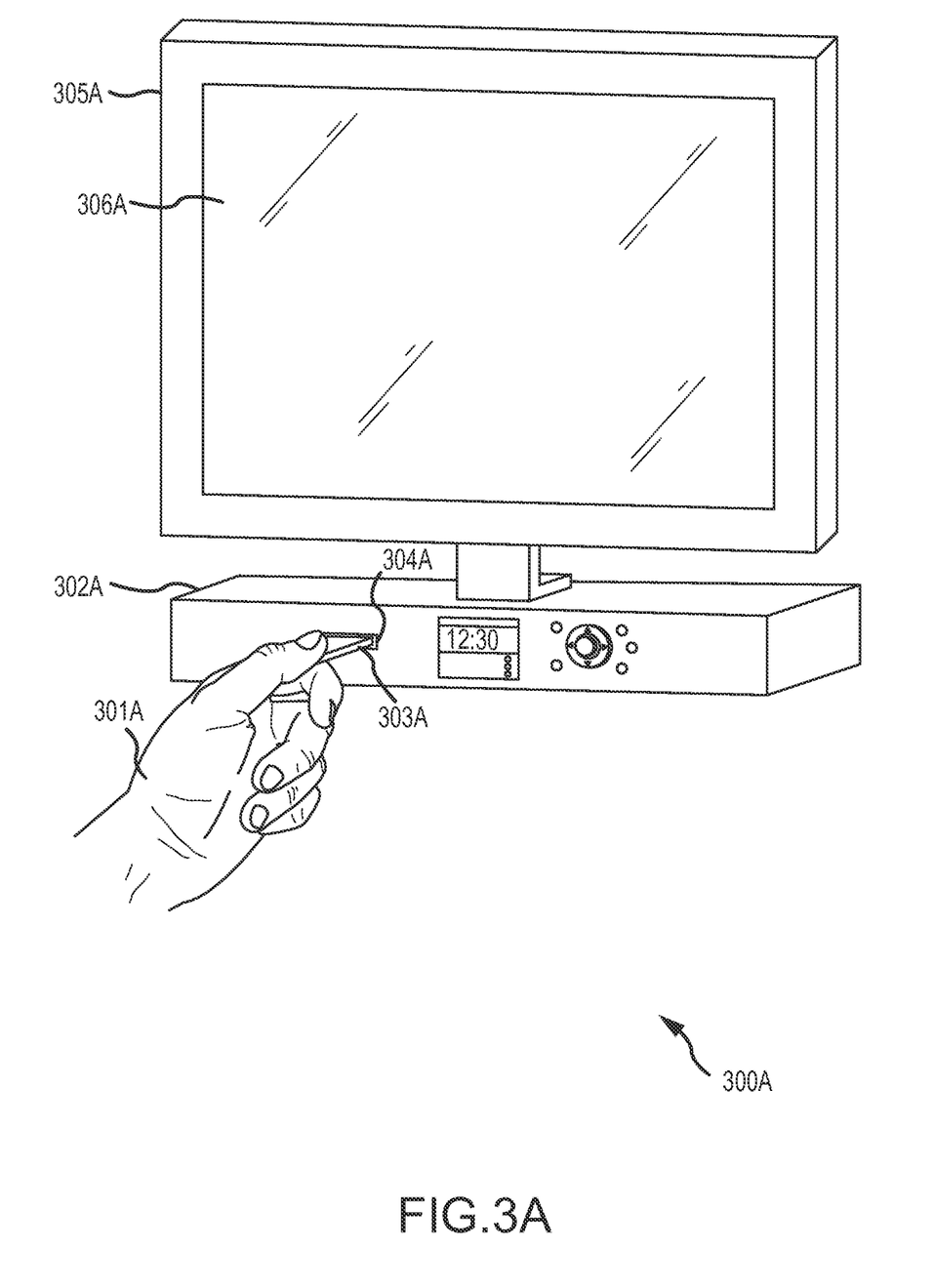
FIGS. 3A-3D are diagrams illustrating a user utilizing a system to confirm a content receiver has been updated by pairing a data card with a content receiver. The system may be the system of FIG. 1.

FIGS. 3A-3D illustrate a user 301A-301D utilizing a system 300A-300D for providing notification to a content provider of an update to a content receiver 302A-302D using dynamically generated matrix codes 308B-D displayed on a content display device 305A-D. The system 300A-300D may be the system 100 of FIG. 1. As illustrated in FIG. 3A, the user 301A at the content receiver 302A (such as a set top box) inserts a data card 303A into a card slot 304A provided in the content receiver 302A. The content receiver 302A is communicatively coupled to the content display device 305A having a display 306A.

Figure 3B:
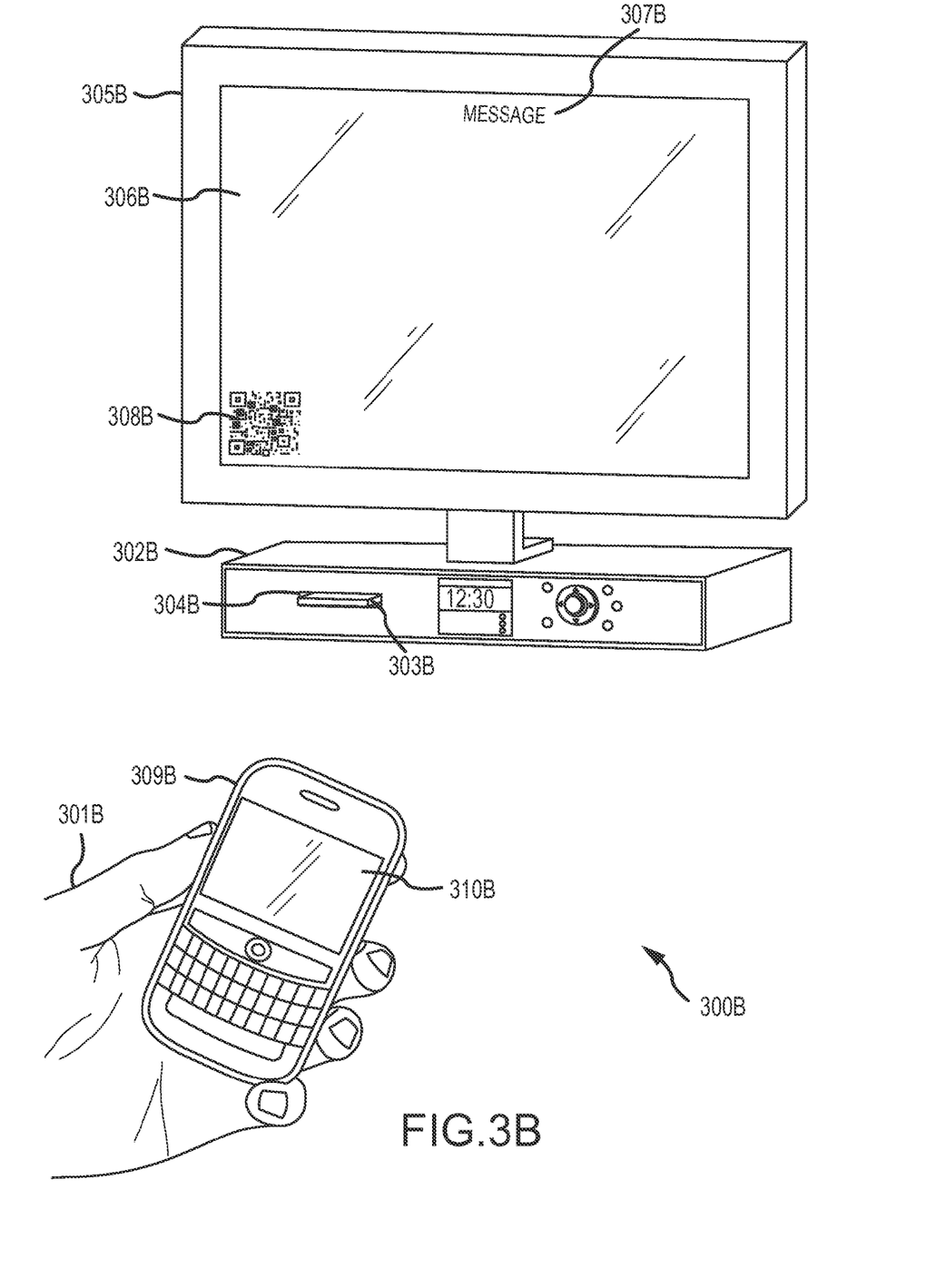

FIG. 3B depicts the system 300B after insertion of the data card 303B into the card slot 304B of the content receiver 302B. The content receiver 302B has executed instructions for dynamically generating a matrix code and for sending the matrix code to the communicatively coupled content display device 305B having the display 306B, and thus in FIG. 3B, the content display device 305B displays the message 307B and the matrix code 308B on the display 306B. The message 307B displayed on the display 306B prompts the user 301B to capture the matrix code 308B. The user 301B then uses the matrix code reader 309B to capture the image of the matrix code 308B displayed on the display 306B. The matrix code reader 309B obtains information from the matrix code and sends the information to the content provider.

Figure 3C:
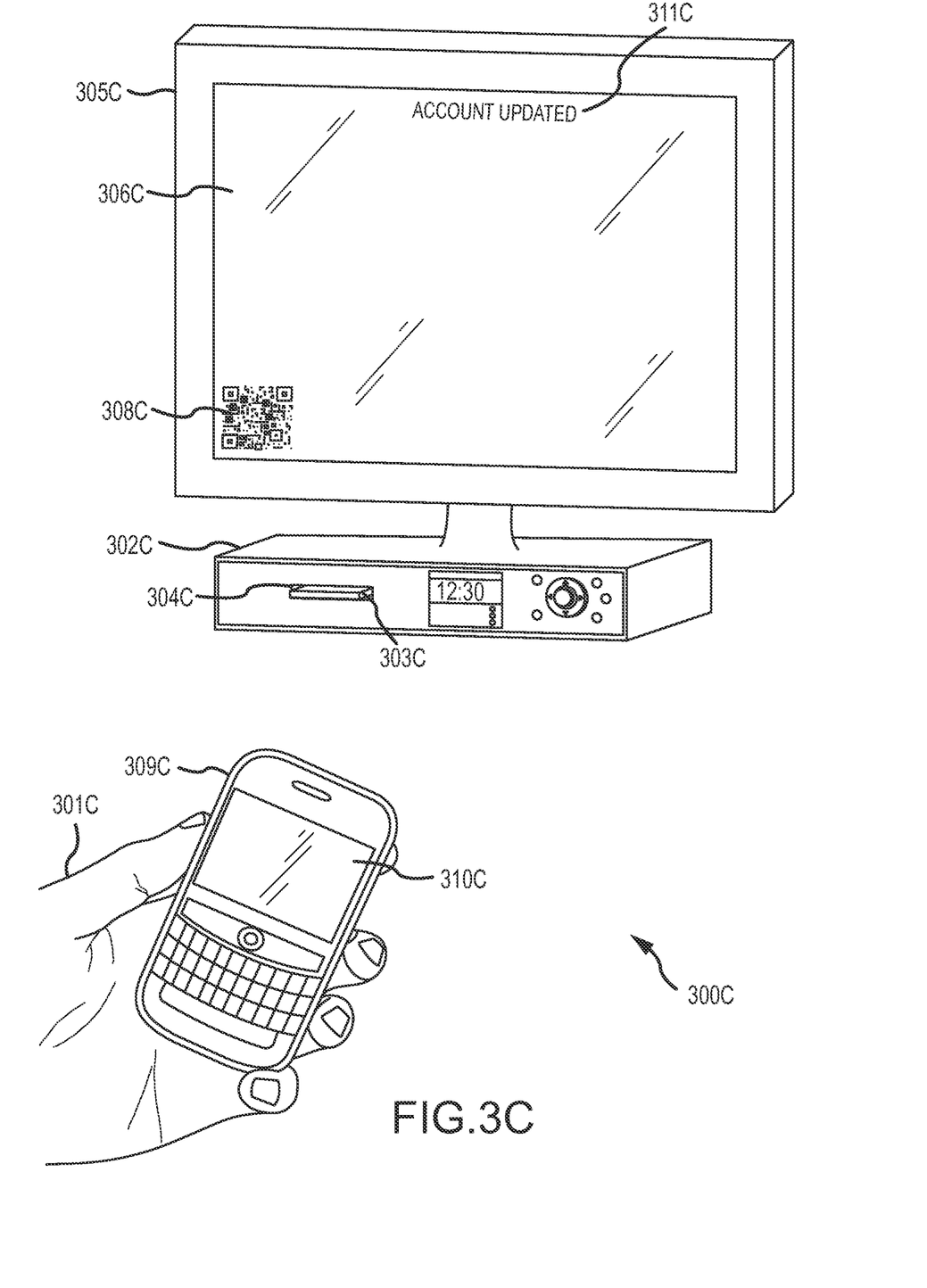

FIG. 3C depicts the system 300C after the remotely located content provider receives the information from the matrix code reader 309C. The content provider has updated the user's account associated with the content receiver 302C and has sent a message to the content receiver 302C indicating the user's account has been updated, and this message is provided by the content receiver 302C to the communicatively coupled content display device 305C. Thus, in FIG. 3C, the content display device 305C displays the account updated message 311C.

Figure 3D:
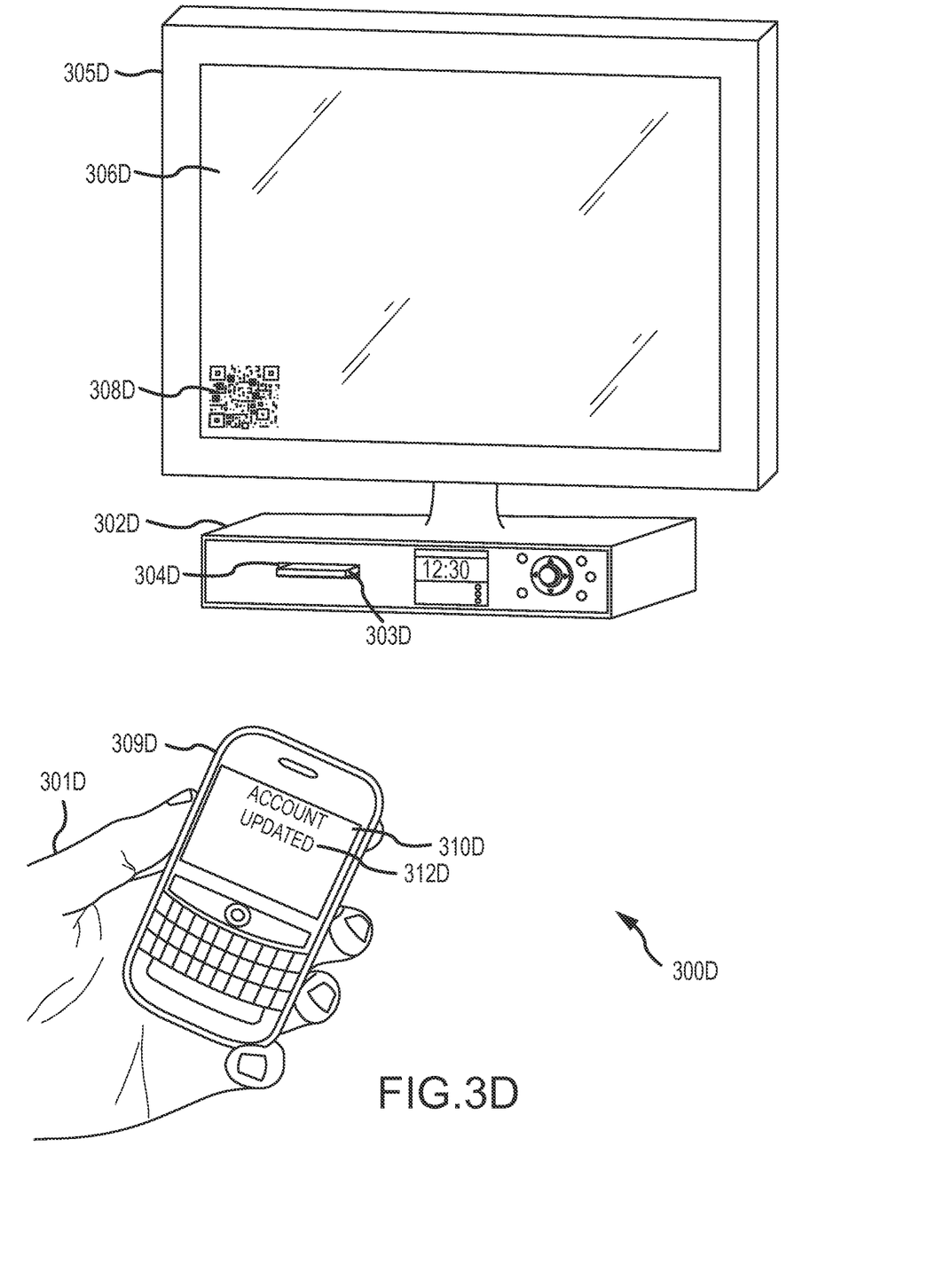

FIG. 3D depicts the system 303D after the content provider receives the information from the matrix code reader 309D, in an alternative implementation. In response to updating the user's account associated with the content receiver 302D, the content provider has sent a message to the matrix code reader 309D indicating the user's account has been updated. Thus, in FIG. 4D, the matrix code reader 309D displays an account update message 312D on the display 310D of the matrix code reader 310D.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for confirming a content receiver has received an update utilizing matrix codes, comprising:
   receiving an update at the content receiver using a source of data;
   dynamically generating a matrix code utilizing the content receiver, wherein the matrix code generated comprises information identifying the source of data for the update to the content receiver and identification data unique to the content receiver; and
   transmitting the matrix code to a content display device utilizing the content receiver, wherein the matrix code is decodable by a matrix code reader that detects the matrix code displayed to initiate an update to a user account associated with the identification data unique to the content receiver, said update including the information identifying the source of data for the update to the content receiver.

2. The method of claim 1, further comprising inserting a data card into the content receiver, wherein the source of data for the content receiver update comprises data stored within the data card.

3. The method of claim 2, wherein in response to inserting the data card in the content receiver, the content receiver is automatically updated utilizing the data stored within the data card.

4. The method of claim 3, wherein the content receiver security access information stored within the content receiver is automatically updated.

5. The method of claim 3, wherein the content receiver software data is automatically updated.

6. The method of claim 1, further comprising generating a message in the content receiver that the content receiver has been updated and displaying the message on the content display device.

7. The method of claim 1, further comprising receiving, at the content receiver, a message that the user account has been updated, and transmitting the message to the content display device.

8. The method of claim 1, further comprising generating a message utilizing the content receiver, said message prompting a user to capture the matrix code utilizing the matrix code reader, and transmitting the message to the content display device.

9. The method of claim 1, wherein the content receiver receives content in response to initiating the update to the user account.

10. A system for confirming a content receiver has received an update utilizing matrix codes, comprising:
    a content receiver comprising:

a processing unit for dynamically generating a matrix code, wherein the information contained within the matrix code comprises information identifying a source of data for the update to the content receiver and identification data unique to the content receiver;

a communications unit for transmitting the matrix code to a content display device; and a content provider remotely located from the content receiver;

wherein the matrix code is decodable by a matrix code reader that optically captures an image of the matrix code displayed on the display unit to initiate an update to a user account at the content provider, said user account associated with the identification data unique to the content receiver and updated with information identifying the source of data for the update to the content receiver.

11. The system of claim 10, wherein the source of data used to update the content receiver comprises a data card configured to be inserted in the content receiver.

12. The system of claim 11, wherein the data card is configured to store security access information used for updating the content receiver.

13. The system of claim 11, wherein the data card is configured to store software used for updating the content receiver.

14. The system of claim 10, wherein the content receiver is configured to deliver a message to the content display device that the content receiver has been updated.

15. The system of claim 10, wherein the content receiver communications unit is configured to receive a message from the content provider that the user account has been updated.

16. The system of claim 15, the content receiver communications unit is configured to receive a message from the content provider that a memory unit of the content receiver has been updated.

17. A system for confirming a content receiver has received an update utilizing matrix codes, comprising:
 a matrix code reader comprising:
  an optical input unit for optically detecting a matrix code displayed on a display unit;
  a processing unit for decoding the detected matrix code, wherein the information contained within the matrix code comprises information identifying a source of data for an update to a content receiver and identification data unique to the content receiver;
  a communications unit for transmitting information in the decoded matrix code to a content provider;
  wherein the transmitted information initiates an update to a user account at the content provider, said user account associated with the identification data unique to the content receiver and updated with information identifying the source of data for the update to the content receiver.

18. The system of claim 17, wherein the matrix code reader further comprises a display unit, and the communications unit is configured to receive a message from the content provider that the user account has been updated and to display the message on the display unit.

19. The system of claim 17, wherein the matrix code reader further comprises a display unit, and the communications unit is configured to receive a message from the content provider that the content receiver has been updated and to display the message on the display unit.

20. The system of claim 19, wherein the communications unit is configured to receive a message from the content provider that the user account has been updated and to display the message on the display unit.

* * * * *

UNITED STATES PATENT AND TRADEMARK OFFICE
CERTIFICATE OF CORRECTION

PATENT NO.        : 8,511,540 B2
APPLICATION NO.   : 13/031115
DATED             : August 20, 2013
INVENTOR(S)       : Jason Anguiano Page 1 of 1

It is certified that error appears in the above-identified patent and that said Letters Patent is hereby corrected as shown below:

In the Claims

Column 12, lines 3-5 in the Claim 17;

Please delete:

"a matrix code reader comprising:
an optical input unit for optically detecting a matrix code displayed on a display unit;"

and replace with:

"unit;
a matrix code reader comprising:
an optical input unit for optically detecting a matrix code displayed on a display;"

Signed and Sealed this
Twenty-first Day of October, 2014

Michelle K. Lee
*Deputy Director of the United States Patent and Trademark Office*